(12) United States Patent
Kawamae

(10) Patent No.: US 8,103,878 B2
(45) Date of Patent: Jan. 24, 2012

(54) CONTROL DEVICE, UPDATE METHOD AND CONTROL SOFTWARE

(75) Inventor: Osamu Kawamae, Kawasaki (JP)

(73) Assignees: Hitachi, Ltd., Tokyo (JP); Hitachi-LG Data Storage, Inc., Tokyo (JP)

( * ) Notice: Subject to any disclaimer, the term of this patent is extended or adjusted under 35 U.S.C. 154(b) by 663 days.

(21) Appl. No.: 12/098,625

(22) Filed: Apr. 7, 2008

(65) Prior Publication Data

US 2008/0307230 A1 Dec. 11, 2008

(30) Foreign Application Priority Data

Jun. 6, 2007 (JP) .................................. 2007-149883

(51) Int. Cl.
*H04L 9/32* (2006.01)
*H04L 29/06* (2006.01)
*G06F 12/14* (2006.01)
*G06F 11/30* (2006.01)
*G06F 9/44* (2006.01)

(52) U.S. Cl. ......... 713/176; 713/165; 713/193; 717/168

(58) Field of Classification Search ...................... None
See application file for complete search history.

(56) References Cited

U.S. PATENT DOCUMENTS

| | | | | |
|---|---|---|---|---|
| 4,933,969 A | * | 6/1990 | Marshall et al. | 713/177 |
| 2003/0188160 A1 | * | 10/2003 | Sunder et al. | 713/165 |
| 2004/0133794 A1 | * | 7/2004 | Kocher et al. | 713/193 |
| 2006/0026304 A1 | * | 2/2006 | Price | 710/8 |
| 2007/0033419 A1 | * | 2/2007 | Kocher et al. | 713/193 |
| 2007/0094654 A1 | * | 4/2007 | Costea | 717/168 |
| 2008/0244554 A1 | * | 10/2008 | Kadashevich | 717/168 |

FOREIGN PATENT DOCUMENTS

| | | |
|---|---|---|
| JP | 5-227248 | 9/1993 |
| JP | 2004-280284 | 10/2004 |
| JP | 2004-299389 | 10/2004 |
| JP | 2004-303209 | 10/2004 |
| JP | 2005-202503 | 7/2005 |
| WO | WO 2005/060255 A1 | 6/2005 |

* cited by examiner

*Primary Examiner* — Shin-Hon Chen
(74) *Attorney, Agent, or Firm* — Antonelli, Terry, Stout & Kraus, LLP.

(57) ABSTRACT

To update the program, the file is updated by verifying according to a digital signature attached to the file having the program converted whether the file is not dishonestly falsified. To verify the digital signature, a time for verifying the signature can be shortened by verifying not the entire file but only a particularly important part, and an area for temporarily storing the file can be made small. Thus, the control can be performed to update only when the file is valid.

8 Claims, 6 Drawing Sheets

CONTROL DEVICE, UPDATE METHOD AND CONTROL SOFTWARE

INCORPORATION BY REFERENCE

The present application claims priority from Japanese application JP2007-149883 filed on Jun. 6, 2007, the content of which is hereby incorporated by reference into this application.

BACKGROUND OF THE INVENTION

1. Field of the Invention

The present invention relates to a device which installs a program to perform an operation control, and more particularly to a system which has a mechanism of downloading and updating a program.

2. Description of the Related Art

Optical disc drives are rapidly spreading in a form mounted in PCs (Personal Computers). Many of them have a microcomputer and operate according to the contents stored in a file which has a program called as firmware for controlling the microcomputer converted into an executable format. This firmware sometimes has the program updated with addition of a function and can be updated by downloading a file having the updated program converted.

As a technology of downloading such firmware, JP-A-5-227248 describes a method of downloading firmware, which is minimum required for control of a communication control unit, for split download of the firmware of the communication control unit.

SUMMARY OF THE INVENTION

In recent years, there are many situations that PCs are infected with computer viruses as the network is spreading rapidly. There are various types of computer viruses, and lots of them cause problems in the PC operation by invading as an unauthorized program into the PCs. If such an unauthorized program invades as a program for the microcomputer, the microcomputer is disturbed from operating properly because of the unauthorized program, and its equipment cannot be operated properly either.

The present invention is an update method of updating a program of a control device for controlling the operation of a system according to the program with a digital signature (also called electronic signature) attached to a part of a file which has the program converted, comprising a step of writing a new file into a memory for storing files; a step of reading the digital signature-attached file and the digital signature; and a step of verifying according to the digital signature that the file is not falsified, wherein the digital signature-attached file and the digital signature are read before the step of writing the new file into the memory for storing files; and the memory for storing files is rewritten by the new file after verifying according to the digital signature that the file is not falsified.

According to the present invention, it becomes possible to update a proper program by checking whether or not the program is authorized at the time of updating firmware.

Other objects, features and advantages of the invention will become apparent from the following description of the embodiments of the invention taken in conjunction with the accompanying drawings.

DESCRIPTION OF THE EMBODIMENTS

A download of firmware according to the present invention is described below. It is to be noted that the present invention is described with reference to an optical disc drive but not particularly limited to the optical disc drive and can also be applied to a system that updates a program (control program) which controls the microcomputer by, for example, a source code of a C language which describes the processing operation of firmware.

Figure 1:
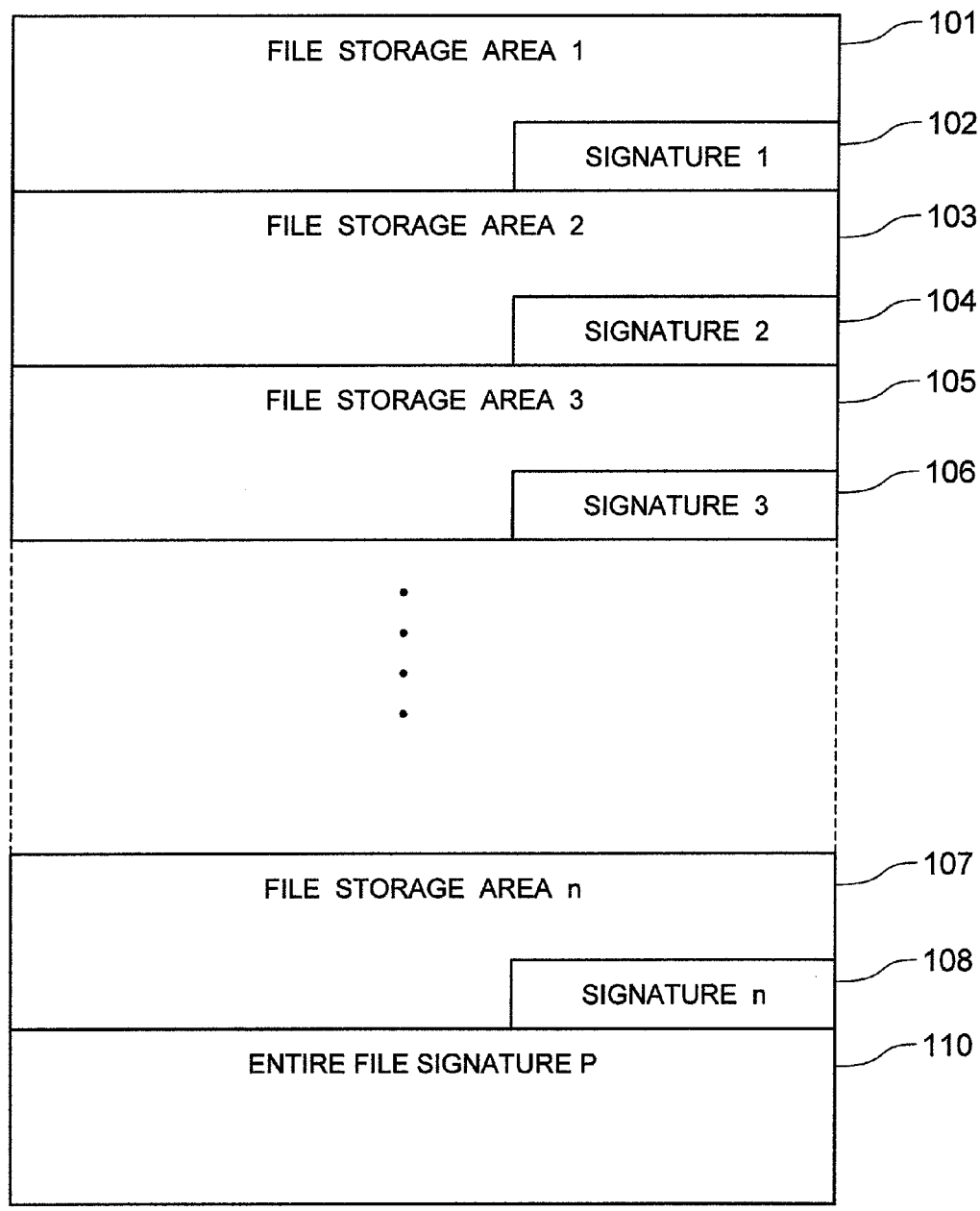
FIG. 1 is a diagram showing an example of a structure of a file to which a digital signature is attached according to the present invention.

FIG. 1 shows an example of a structure of firmware. Numerals 101, 103, 105 and 107 indicate areas where files having programs converted are stored, and the files are to control really the operation of the microcomputer by, for example, compiling the programs, changing into an executable format and storing into a flash-ROM. Numerals 102, 104, 106 and 108 indicate digital signatures which are attached to the files stored in the individual areas. There is a relationship that a 102 digital signature 1 is attached to a 101 file storage area 1. Numeral 110 is a digital signature P for the entire file.

The digital signature is information to be attached in order to assure the validity of the file. The digital signature is generally obtained by encrypting a value which is determined by using fixed length data which is obtained from the file according to a certain law, for example, a one-way function such as a Hash function, by a party that creates a signature of the file by using its secret key. A receiver of the file uses a public key corresponding to the secret key to decode the digital signature in order to check the validity of the file and compares it with a Hash value similarly obtained from the file, and if they agree, it can be judged that they are identical.

Here, a digital signature method is not particularly limited, but it is one which can determine the value of a different digital signature if the original data to which the digital signature is attached is changed. Thus, in case of falsification, the digital signature can be useful to detect the falsification.

The signature P for the entire file is to calculate the Hash value using the entire file and can be checked whether the entire file range is falsified. But, when the file becomes large, calculation of the Hash value takes time, and the signature verification takes time too. Here, the entire file is divided into plural areas in this embodiment, and the digital signature is attached to each of them. A digital signature 1 attached to a file storage area 1 may be determined for the Hash value by calculating only data of the file storage area 1, so that the calculation time can be made shorter than when the Hash value is calculated for the data of the entire file. To check the validity of the entire file, it is necessary to verify the digital signature attached to the entire file. But, if a part of the file is an important part which should not be falsified and if it is appropriate to check the validity of the area including the pertinent part, it becomes possible to check the validity of the important part by dividing the file, attaching the signature to them and verifying the signature of the necessary part. If the file storage area is divided and the digital signature is attached to each of them, the signature P for the entire file is not always required. And, if the important part of the file is partial, for example, if a copy protection function becomes invalid by falsifying that part, attachment of the signature to the important part of the file makes it also possible to omit the signature verification of other areas.

Figure 3:
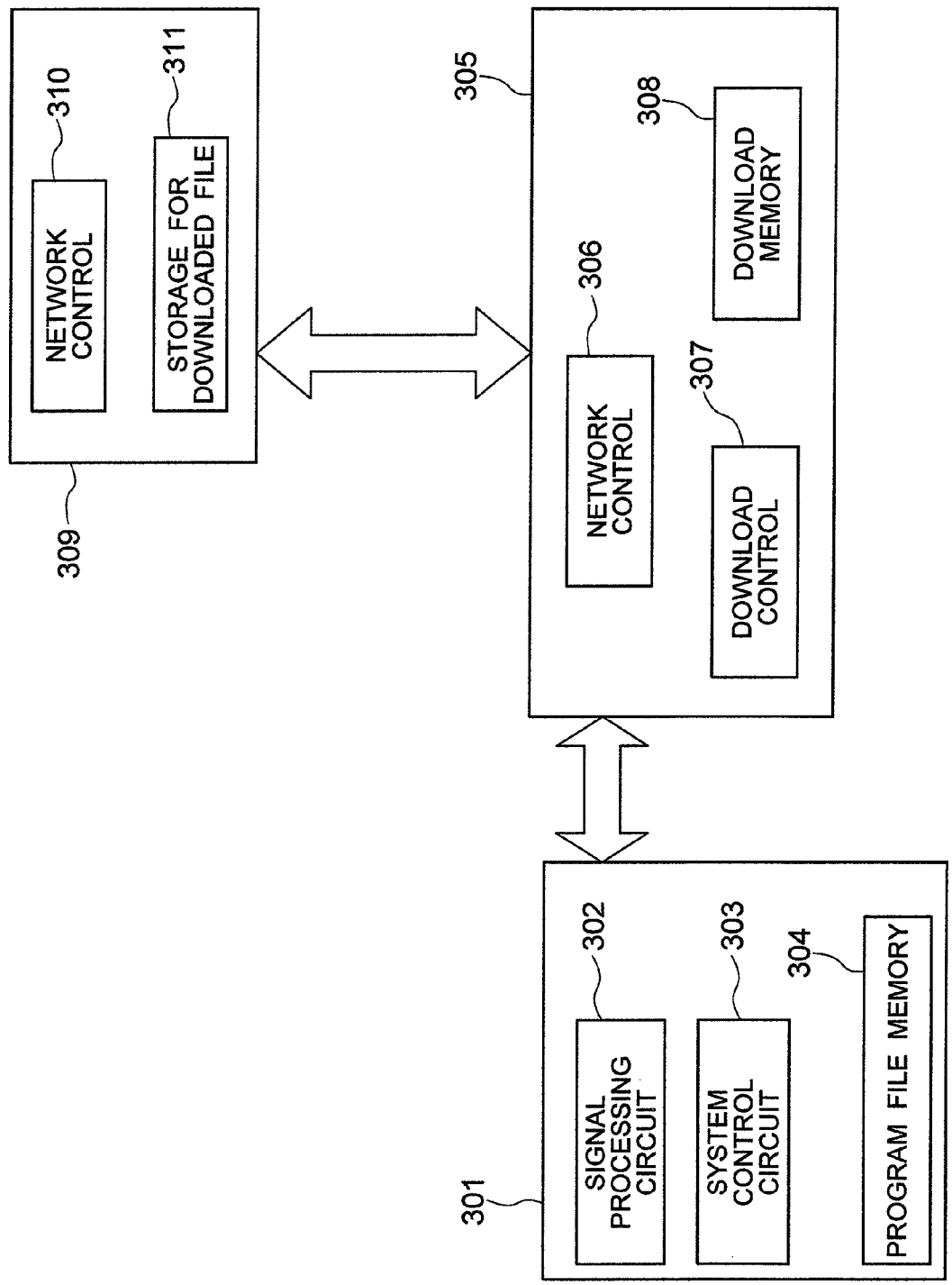
FIG. 3 is a diagram showing a structure example of a system which downloads a file through a network.
Figure 4:
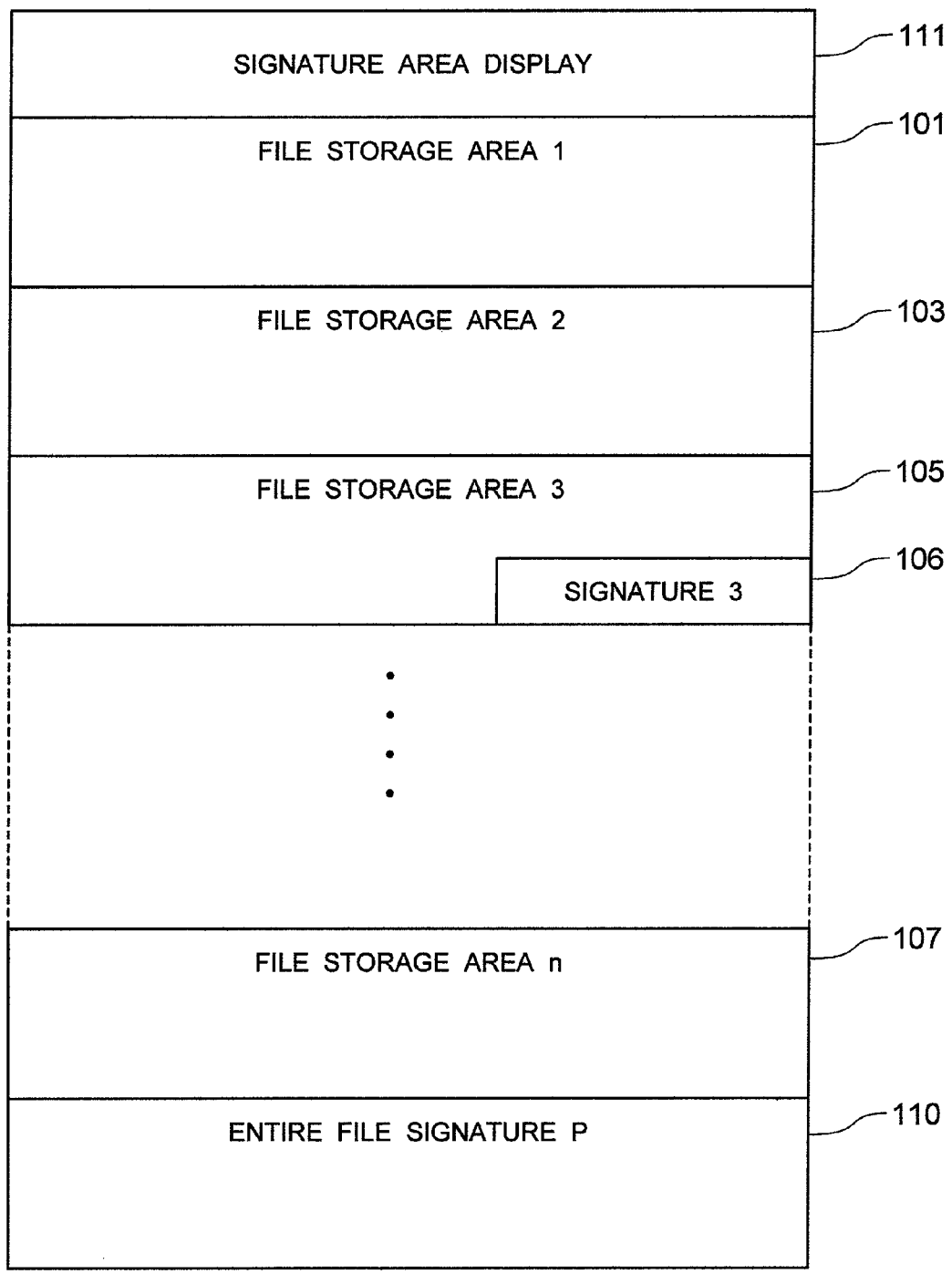
FIG. 4 is a diagram showing another example of the structure of a digital signature-attached file according to the present invention.

The example of FIG. 1 divides the file storage area into plural portions and attaches a digital signature to each of them, but FIG. 4 is an example of attaching the digital signature to only an important portion of the file. Here, a signature area display portion 111 shows to which file storage area is attached the digital signature. For example, in a case where a file describing an operation is converted into a code of an executable format, a flag indicating where of the memory area the code is positioned is attached to the code of the executable format corresponding to an important part of the file. The position of the memory area is stored in the signature area display portion 111, so that it can be detected which area the signature is attached. The area where the signature is attached may not be one but plural. In such a case, identification numbers indicating plural areas can be described in the signature area display portion 111 to indicate them. Otherwise, first and last addresses of the signature areas may be indicated. In the figure, the signature area display portion 111 is positioned at the head of the file but not limited to it if located at a particular position. If there is provided another signature area indicating means, it is not necessary to put in the file storage area. For example, it may be stored in correspondence with a file in a storage in which a file to be described later in FIG. 3 is stored and may be transferred at the same time when the file is downloaded.

When the program is converted to create a file, the program may be previously divided for each definite processing, and a storing area on the memory may be arranged separately for each processing of the program. Thus, it can be clarified which portion of the memory the program is stored, the signature area display portion 111 can be detected clearly, and a portion corresponding to the program of the same processing can be arranged, for example, at the same position on the memory. Thus, the divided file conversion is performed, so that it can be controlled whether an important portion is converted in the processing of the program and arranged in an area of a particular memory, it becomes easy to attach the signature to that particular area, and the signature verification can be made by checking the same area, so that it becomes easy to control for the signature check.

Figure 5:
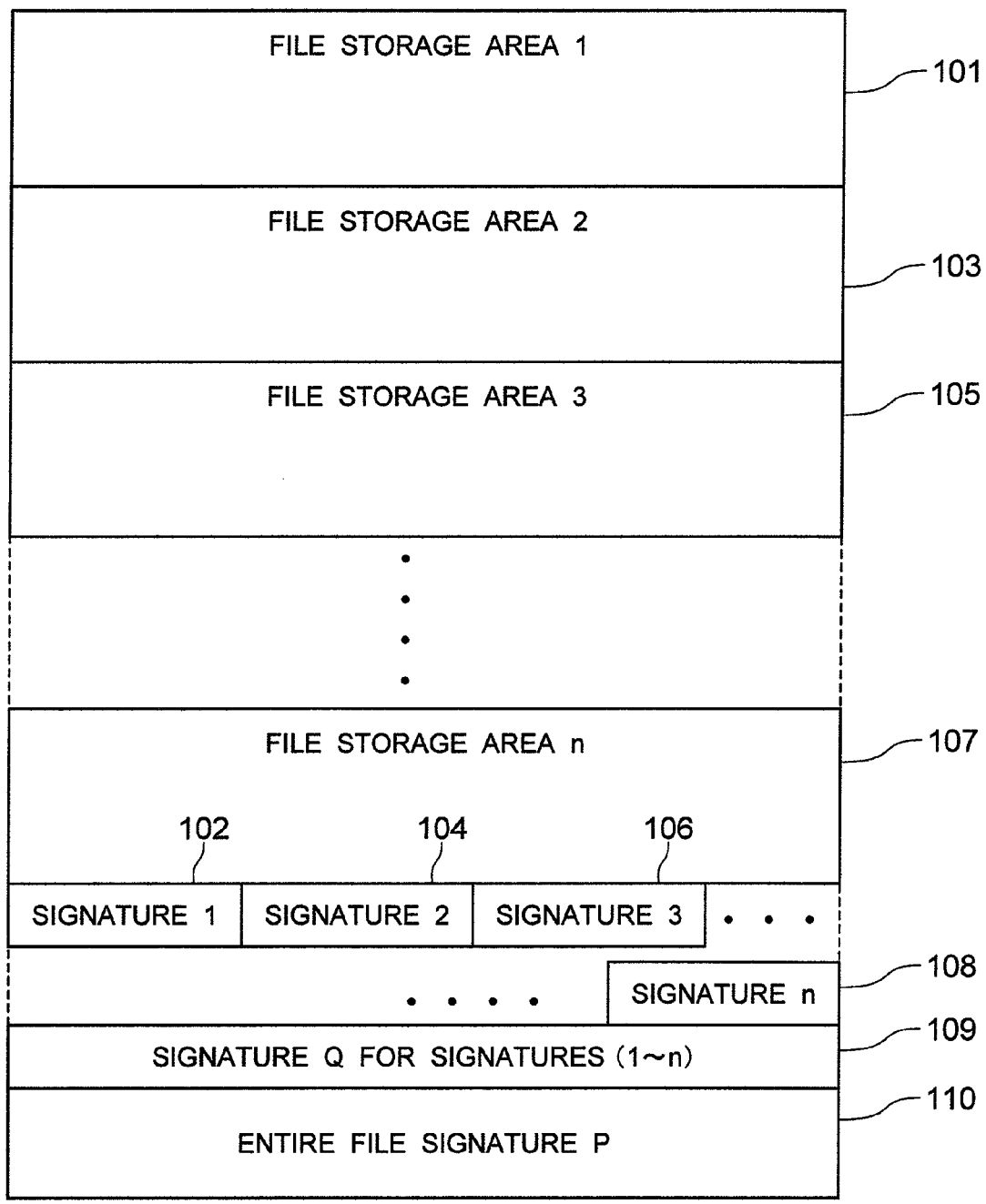
FIG. 5 is a diagram showing another example of the structure of a digital signature-attached file according to the present invention.

FIG. 5 shows an example that the signatures of the areas shown in FIG. 1 are collectively stored and signatures are further attached to only the signatures of the individual areas. Numerals 102, 104, 106 and 108 are digital signatures which are attached to the files of the individual areas, and 109 is a signature attached to the signatures (1 to n). Thus, the collection of the signatures of the respective areas facilitates collective reading of the signature portion only. And, it can be confirmed by checking a signature Q for the signatures (1-n) that at least the signature portion is not falsified.

Figure 2:
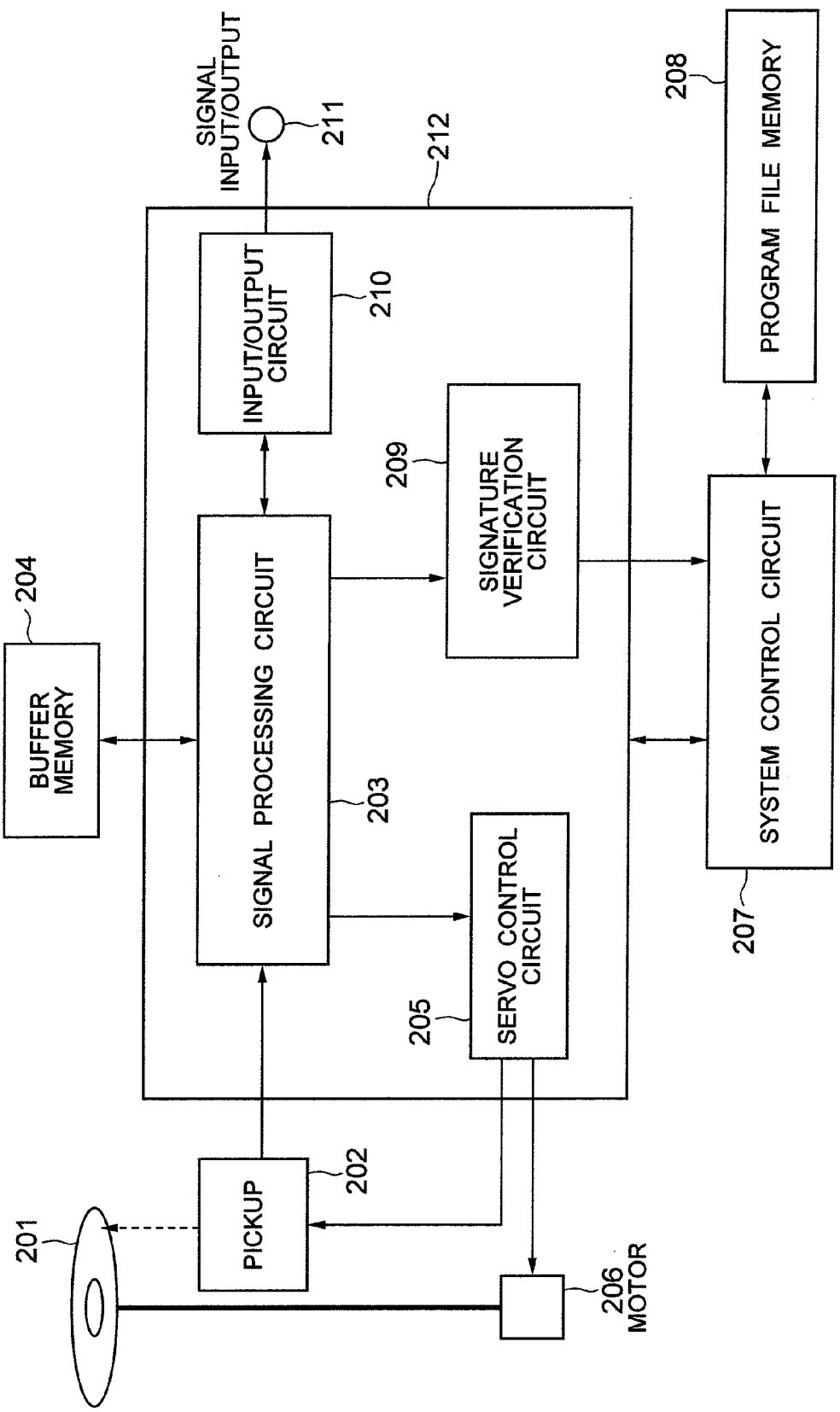
FIG. 2 shows an example of a structure of a device which downloads a file according to the present invention.

FIG. 2 shows an example of a device structure of an optical disc drive which updates a file. Numeral 201 is an optical disc, 202 is a pickup, 203 is a signal processing circuit, 204 is a buffer memory, 205 is a servo control circuit, 206 is a motor, 207 is a system control circuit, 208 is a program file memory, 209 is a signature verification circuit, 210 is an input/output circuit, 211 is a signal input/output, and 212 is a signal processing integrated circuit.

First, a record reproduction operation of the optical disc drive is described. A laser is irradiated from the pickup 202, and a signal recorded on the optical disc 201 is read by its reflected light. The read signal is undergone analog signal processing such as amplification, waveform equalization or the like and digital processing such as binarization, demodulation, error correction, address detect or the like by the signal processing circuit 203. At this time, data is temporarily stored in the buffer memory 204 to perform signal processing. The data processed by the signal processing circuit 203 is output from the signal input/output 211. The servo control circuit 205 controls the revolutions of the motor 206 and also performs focus and tracking control to control the laser light from the pickup 202 to the recorded information in the optical disc 201. The system control circuit 207 controls the operation of the entire optical disc drive according to the file stored in the program file memory 208. The signature verification circuit 209 is a circuit for verification of the digital signature attached to the file, extracts the digital signature from the file input through a signal input/output 11 and compares the value determined from the signature with a value which is determined from the file by the same law as the signature creation to check whether or not it is falsified.

Here, to check the entire file signature P of FIG. 1, it is necessary to input the entire file to the signature verification circuit and to calculate. When the file size becomes large, a time to input the file becomes long, and arithmetic processing which is performed to verify the signature is also increased. Therefore, the time for verifying the signature can be decreased by reading a part of the file to verify the signature attached to that part without verifying the signature of the entire file. At this time, to verify the signature of a part of the file, the pertinent file area is first read to verify the signature, so that it is confirmed that it is not dishonestly falsified, and the entire file is read to rewrite the file in the program memory 208. Thus, the dishonestly falsified file can be prevented from being written in the program file memory. To update the file, it is not always necessary to read the entire file. If the file is divided into several portions and the portion required to be updated can be discriminated, the pertinent portion only may be read.

To read the file, the entire file or the pertinent portion for checking the signature may be read and temporarily stored in an empty area of the buffer memory 204. Generally, since the record reproduction processing is not performed when the file is updated, an area in the buffer memory 204 is secured for temporary storage of the file, so that the file can be stored. Accordingly, reading of the file from the outside can be determined to be one time, the reading time can be made short, and it can be checked that the file is dishonestly falsified, so that the program file memory 208 can be updated.

When it is detected by verifying the signature that the file is dishonestly falsified, the information is transmitted to the outside, for example, a host PC, via the signal input/output 211. Here, by transmitting the fact that it is a dishonest file to the host, the host can externally show that the downloaded file is dishonest and can also inform the user that the program has not been updated. At this time, the interface with the outside is not particularly limited to USB or ATAPI, but new command definition is necessary for transmission of the fact that the file is falsified.

Here, a file creation tool which creates a file by converting a program has a step of converting the program into an executable format and a step of creating and attaching a digital signature to a prescribed area. In the step of creating the file by converting the program, the program is previously divided for each definite processing, so that the storing area on the memory can be arranged in a divided form for each program processing. Thus, it can be clarified where of the memory the program is stored, and it becomes possible to arrange a portion corresponding to the program of the same processing at the same position on the memory. And, for the converted file, the signature is attached to a particular area as shown in FIG. 1, 4 or 5. Otherwise, a signature may be attached to an area including a particular processing, and as a signature area display flag, flag information may be attached to the file. Thus, by performing the divided file conversion, it can be controlled whether an important potion in the processing of a program is converted and arranged in a particular area on the memory, it becomes easy to add a signature to the particular area, and the signature verification can be made by checking the same area, so that the control for the signature verification is facilitated.

FIG. 3 shows a mechanism of downloading a file from outside through a network such as the internet. Numeral 301 is an optical disc drive, 302 is a signal processing circuit which is mounted on the optical disc drive, 303 is a system control circuit, and 304 is a program file memory. Numeral 305 is a PC which is provided with a network function having an optical disc drive connected or mounted, 306 is a network control, 307 is a download control, and 308 is a download memory. Numeral 309 is a server in which a downloading program file is stored, 310 is a network control provided to the server, and 311 is a storage for storing a downloaded file.

Described below is a case that a user using the optical disc drive 301 knows that a new version of firmware has been released, uses a PC to download it and updates the firmware of the optical disc drive 301. First, a program of the new version of firmware is stored in the downloaded file storage 311 of the server 309 connected through the network, and the user downloads it via the network. The PC 305 used by the user is installed with a program for controlling data exchange through the network, checks the address of the server, and performs a procedure necessary for download of a file with the server. The server 309 is also installed with a program for network control. The PC secures a download memory having a capacity capable of temporarily storing the downloading file at the time of starting the download. For example, it is secured on a cache memory. An application for controlling the file download processing and the download control program 307 as a downloading tool outputs a download request from the PC 305 to the server 309, the file is downloaded through the network and temporarily stored in the memory 308. The optical disc drive 301 reads the file which is stored in the memory 308 and verifies a signature whether or not the downloaded file is dishonestly falsified. In this case, it is not necessary to store the downloaded program into the buffer memory as shown in FIG. 2, the digital signature and a program of a portion, to which the signature is attached, are read from the memory in the PC 305, to verify the signature. Here, the signature may be verified by the CPU (Central Processing Unit) in the PC. When it is confirmed by verifying the signature that the program is not dishonestly falsified, the entire file or the necessary portion of it is sent to the optical disc drive 301 to update the file stored in the program file memory. Thus, the downloaded file is temporarily stored in the memory of the PC 305, so that the download from the server can be determined to be one time, and if the downloaded file is dishonest, the program file memory of the optical disc drive 301 can be prevented from being updated.

At this time, the optical disc drive 301 may verify the digital signature attached to a part of the file, and the PC 305 may verify the signature of the entire file. The CPU installed in the PC has generally very high performance, so that arithmetic processing can be performed at a high speed. Therefore, the optical disc drive 301 can efficiently check falsification of the downloaded file by verifying the signature of a part of the file, and verifying the signature of the entire file on the side of the PC by the control from the download control program 307.

Before the program file memory is rewritten by downloading the file into the optical disc drive 301, the content of the program file memory is read once and copied into the buffer memory or the memory of the PC, and when it is found by the signature verification that it is a dishonest file, it can be recovered by rewriting.

Figure 6:
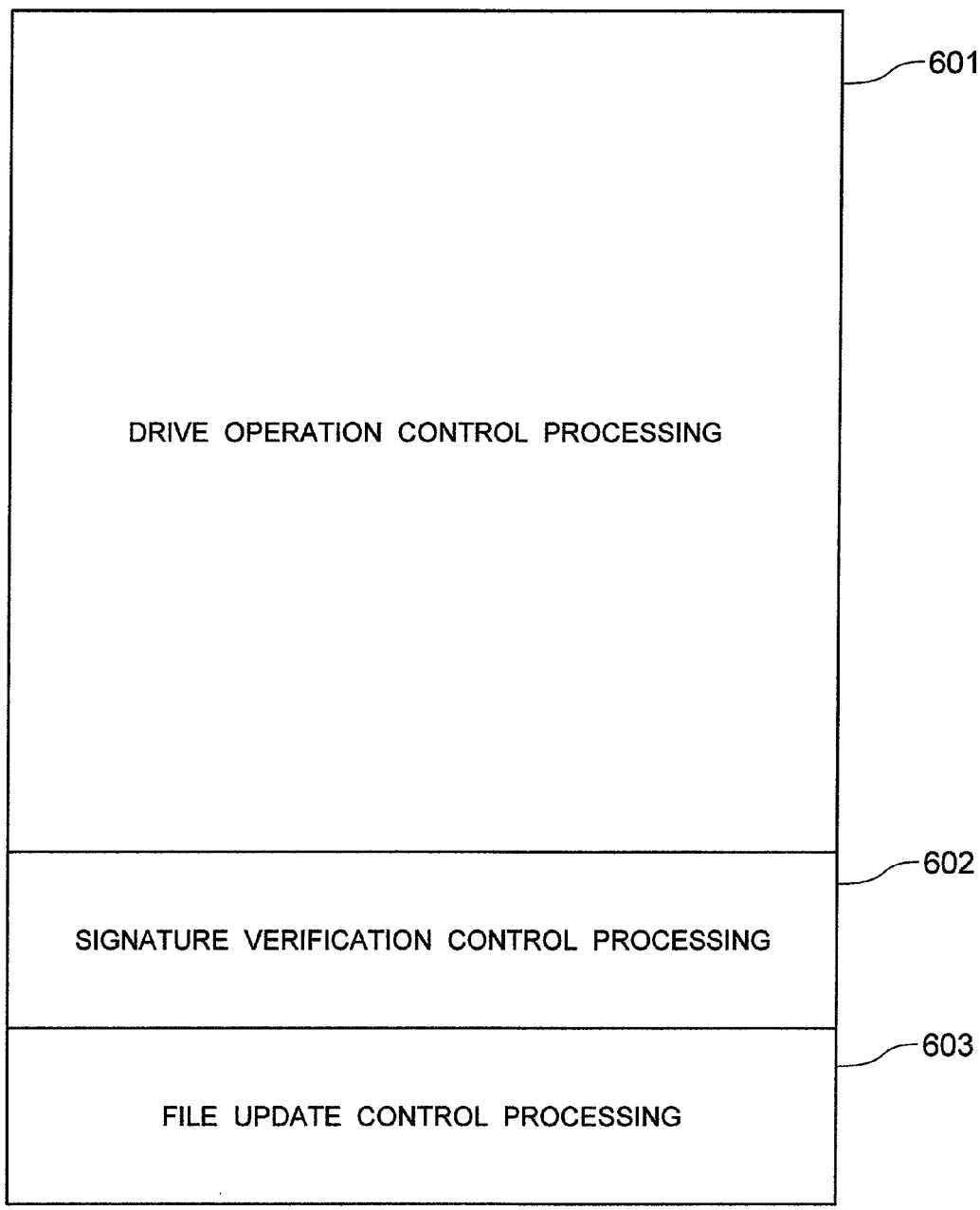
FIG. 6 is a diagram showing an example of a structure of a file having a program converted according to the present invention.

FIG. 6 shows the content of processing when a program is converted to obtain a file. It is not always stored in that state into the program file memory. When a drive is produced and mounted with a program file memory for the first time, a file is not written yet and the memory is in an initial state. Meanwhile, to control an operation of the drive, the file having the program converted is written to provide a state that the drive operation can be executed. Normally, this step is performed in a drive manufacturing stage, so that the written file is appropriate one prepared by a manufacturer. Here, in the drive operation control processing, some processing is secured as an area which cannot be updated for prevention of falsification. It includes a control portion which controls to download a new file from outside and to update the memory, and a processing portion which controls to verify the signature attached to the input file and to reject the update if it is a dishonest file. After the signature is verified, dishonest writing in the memory can be prevented by reading the processing portion for the drive operation control and writing into the memory. In other words, the programs which can be written into the memory are restricted depending on whether the writing of a file into the memory is a first time or a second time or later, such that it is prevented that the signature verification is eliminated or falsification is made. By configuring as described above, it becomes possible to secure the reliability of the program of the drive.

It was described above that the input of the file to be downloaded is made through the interface, but the data input from the interface portion is temporarily stored in the buffer memory. Here, the data read from the optical disc is stored into the buffer memory and subjected to the prescribed processing, so that the update file can be similarly handled as an update file.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. An update method of updating a program of a control device, for controlling the operation of a system according to the program, comprising:
   writing a new file converted from the program, into a memory;
   reading the new file and a digital signature for a part of the new file, the digital signature being attached to the new file; and
   verifying according to the digital signature, that the new file is not falsified, wherein:
   the program is divided into plural parts providing different processings, in which the part is at least one part of said plural parts and corresponds to a predetermined processing and is stored in a predetermined area of the memory as a portion of the stored file, where the predetermined processing is secured as an area which is unable to be updated, it is verified according to the read digital signature and the part of the new file, that the new file is not falsified, before the writing the new file into the memory for storing the files; and the file stored in the memory is rewritten as the new file.

2. The update method according to claim 1, wherein:
a flag indicating where the digital signature of the new file is located, is added to the new file;
the part of the new file is detected according to the flag; and
the digital signature of the part of the new file is verified.

3. The update method according to claim 1, wherein:
the part of the new file is a protected part which is to be protected from being falsified in the program;
the part of the new file is detected; and
the digital signature of the part of the new file is verified.

4. A control device which stores a file converted from a program into a memory and which controls an operation of a system according to the file stored in the memory, comprising:

an update circuit which updates the file written in the memory;

an input/output circuit which reads a new file and a digital signature for a part of the new file, the digital signature being attached to the new file converted from a updated program; and a verification circuit which verifies according to the digital signature and the part of the new file, that the new file is not falsified, wherein:

the program is divided into plural parts providing different processings, in which the part is at least one of said plural parts and corresponds to a predetermined processing and is stored in a predetermined area of the memory as a portion of the stored file, where the predetermined processing is secured as an area which is unable to be updated, and the new file is written in the memory for storing the file, after it is verified that the new file is not falsified.

5. The control device according to claim 4, wherein:
a flag indicating where the digital signature of the new file is located, is added to the new file;
the part of the new file is detected according to the flag; and
the digital signature of the part of the new file is verified.

6. The control device according to claim 4, wherein:
the part of the new file is a protected part which is to be protected from being falsified in the program;
the part of the new file is detected; and
the digital signature of the new file is verified.

7. The control device according to claim 4, wherein:
a flag indicating where the digital signature of the new file is located, is added to the new file;
the part of the new file where the digital signature is attached is detected according to the flag;
the part of the new file is temporarily stored in a second memory in order to verify the digital signature of the part of the new file; and
the digital signature is verified by reading the part of the new file from the second memory.

8. The control device according to claim 4, wherein:
a flag indicating where the digital signature of the new file is located, is added to the new file;
the part of the new file is detected according to the flag;
the part of the new file is temporarily stored in a second memory in order to verify the digital signature of the part of the new file;
the digital signature is verified by reading the part of the new file from the second memory; and
the file is prohibited from being updated when falsification is detected according to the digital signature.

* * * * *